Dec. 22, 1942.　　　F. STONEBERG　　　2,305,909
GAS CUTTING APPARATUS
Filed May 31, 1941　　　5 Sheets-Sheet 1
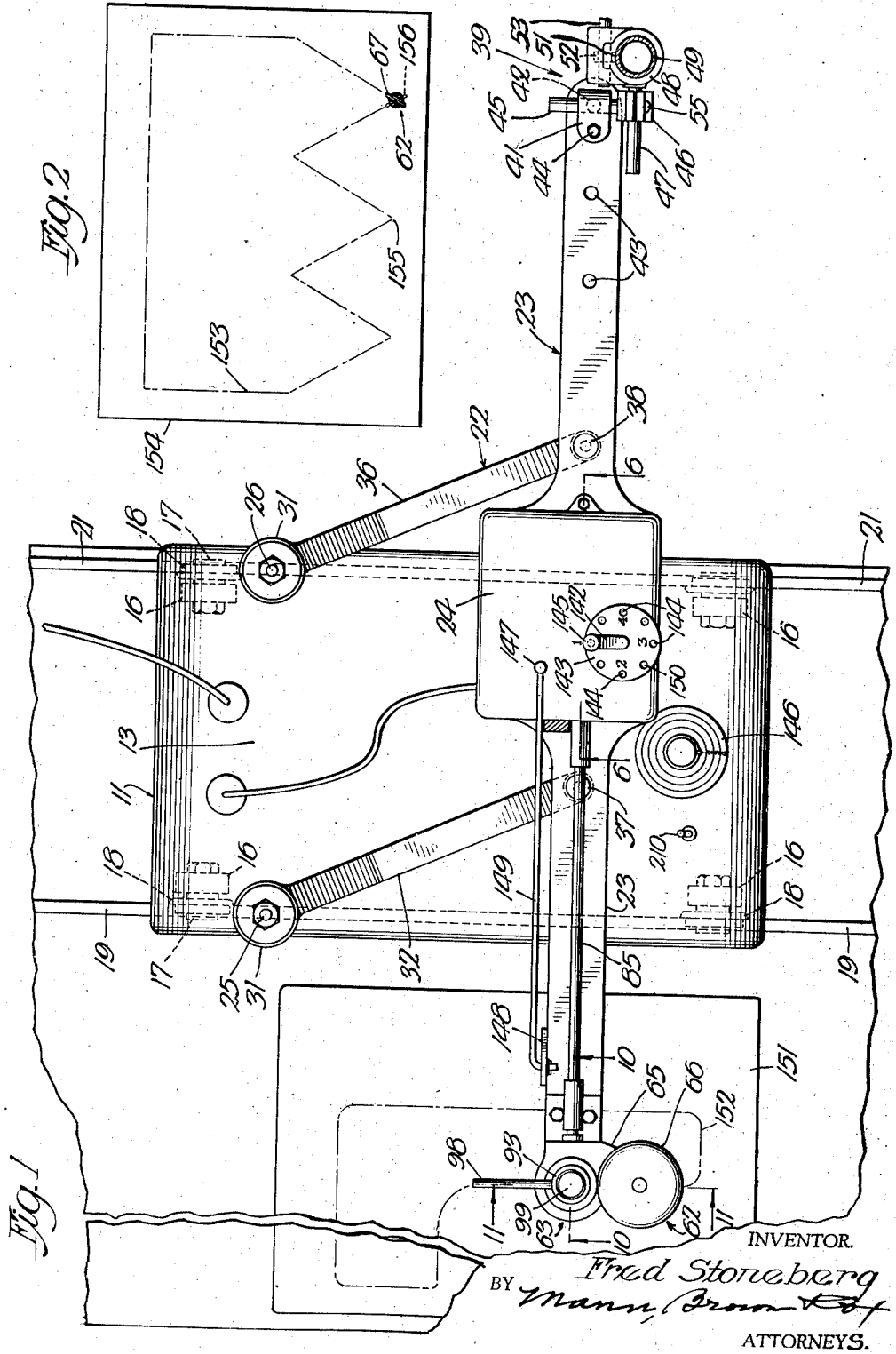
INVENTOR.
Fred Stoneberg
BY
ATTORNEYS.

Dec. 22, 1942.　　　F. STONEBERG　　　2,305,909
GAS CUTTING APPARATUS
Filed May 31, 1941　　　5 Sheets-Sheet 2
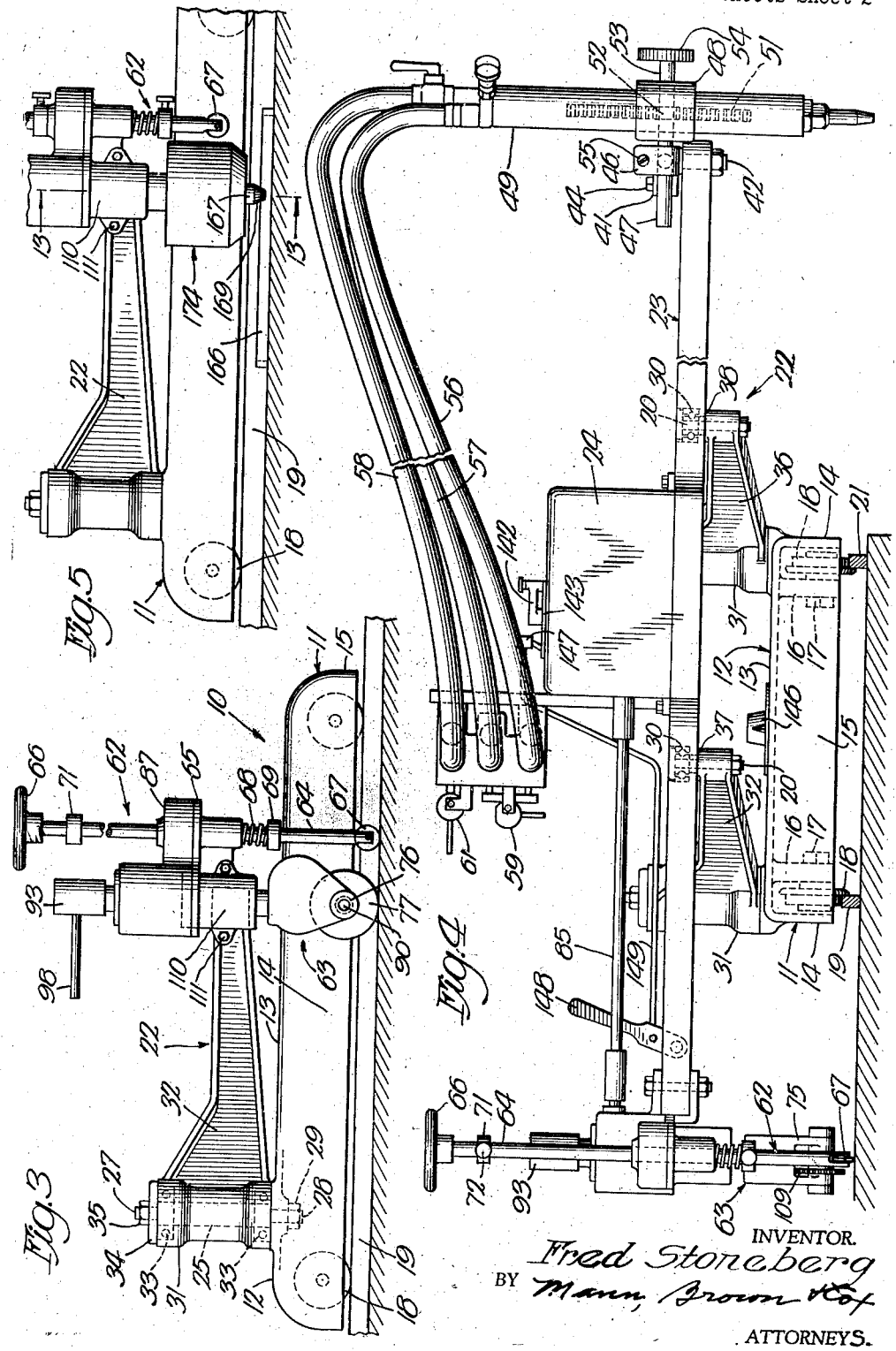
INVENTOR.
Fred Stoneberg
BY Mann, Brown & Cox
ATTORNEYS.

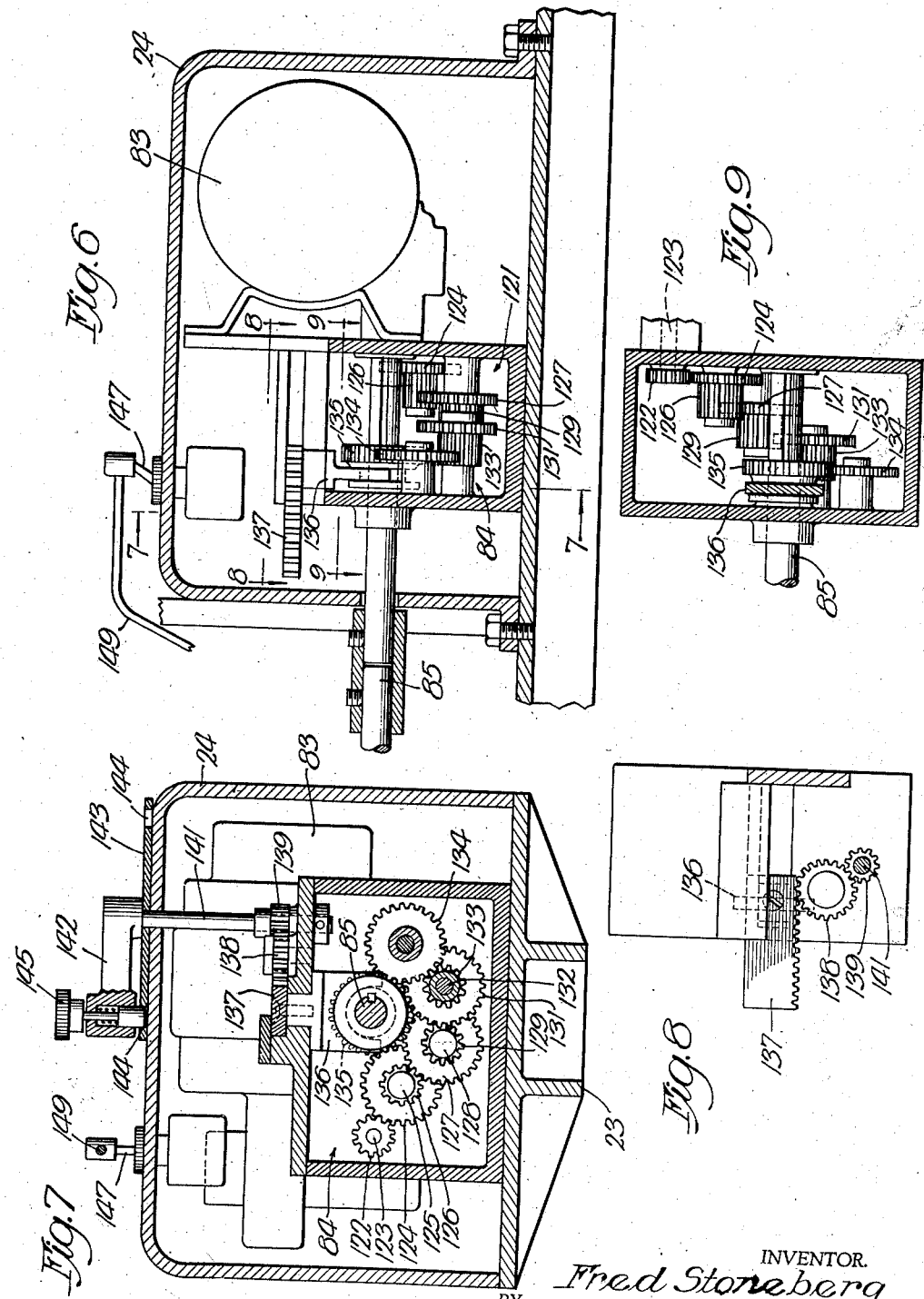

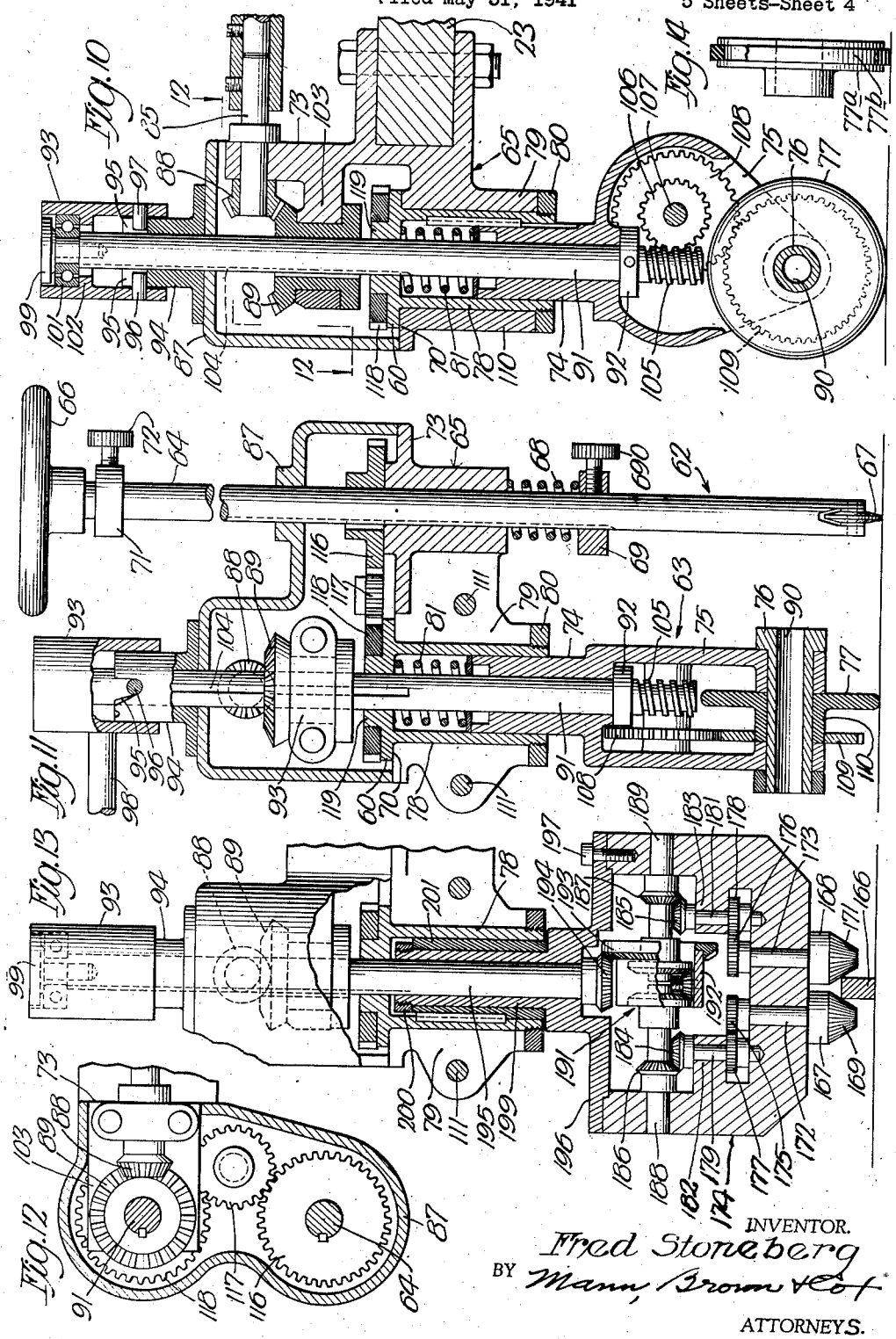

Dec. 22, 1942.  F. STONEBERG  2,305,909
GAS CUTTING APPARATUS
Filed May 31, 1941   5 Sheets-Sheet 5
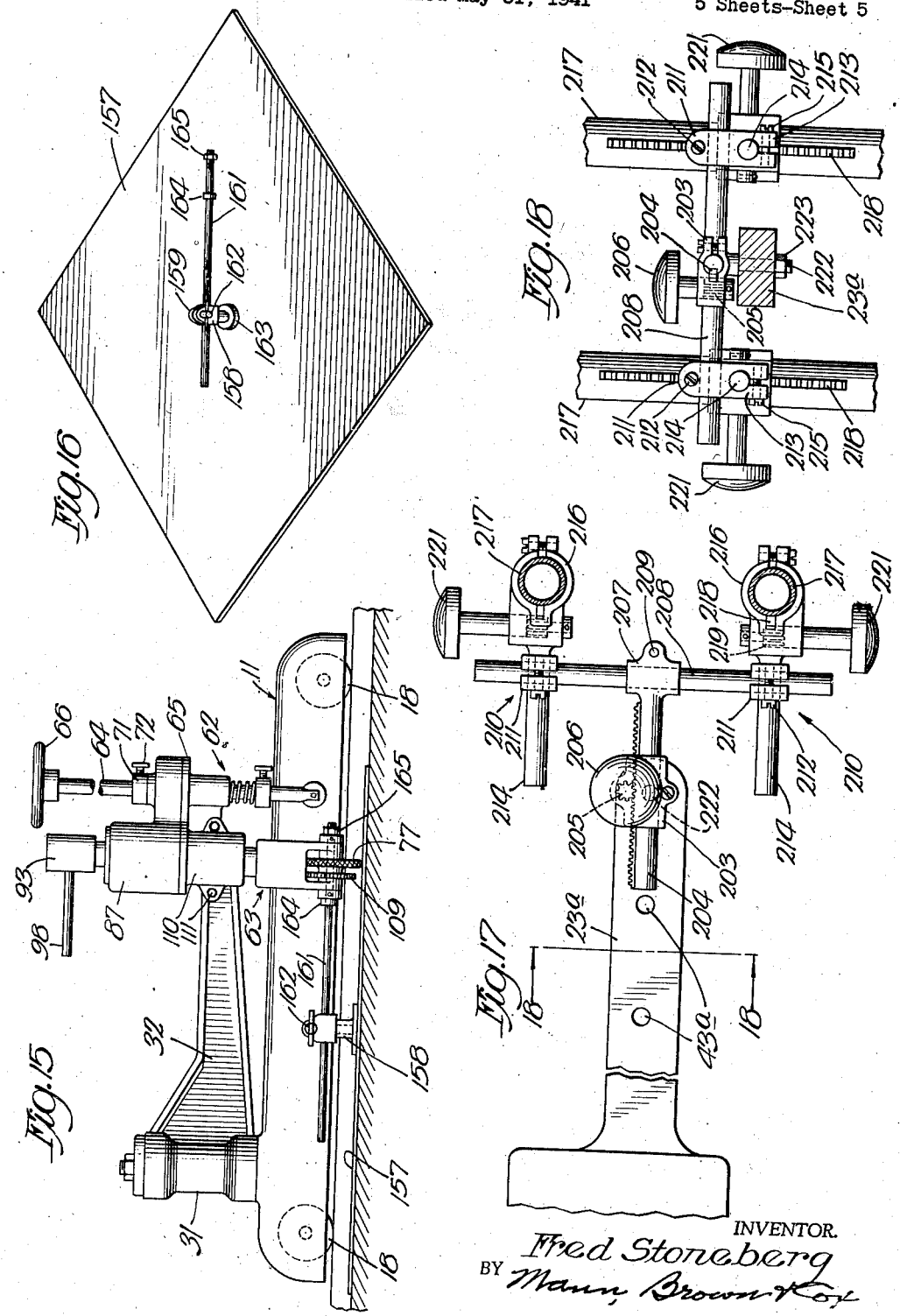
INVENTOR.
Fred Stoneberg
BY Mann, Brown & Fox
ATTORNEYS.

Patented Dec. 22, 1942

2,305,909

UNITED STATES PATENT OFFICE 2,305,909

GAS CUTTING APPARATUS

Fred Stoneberg, Chicago, Ill., assignor to Gaso Equipment Co., a corporation of Illinois Application May 31, 1941, Serial No. 395,954

14 Claims. (Cl. 266—23)

This invention relates to gas cutting apparatus and more particularly to the type in which the cutting mechanism is transported by a carriage and the torch supporting arms are guided by the aid of a tracing or template.

One of the objects of the invention is the provision of a new and improved gas cutting apparatus having novel means for operating the guide mechanism for controlling the movement of the torch supporting arms.

A further object of the invention is the provision of a new and simplified change speed mechanism for varying the speed of the torch supporting carriage.

A further object of the invention is the provision of a novel carriage having mounted thereon new and improved torch supporting elements carrying tracer means operated by a motor mounted on the carriage.

Another object of the invention is a new and improved tracer mechanism engaging a template for guiding the torch supporting mechanism.

A still further object of the invention is the provision of a new and improved gas cutting mechanism and guiding means that is simple in construction, efficient in operation, inexpensive to manufacture and install and that is composed of comparatively few moving parts.

Other and further objects and advantages of the invention will appear from the following description, taken in connection with the accompanying drawings, in which—

Fig. 1 is a top plan view of the apparatus with parts in section and parts omitted for the sake of clearness;

Fig. 2 is a plan view of the tracing chart or member;

Fig. 3 is a side elevation of the apparatus;

Fig. 4 is an end elevation thereof;

Fig. 5 is a side elevation of the apparatus showing a modified form of tracer head;

Fig. 6 is a section on the line 6—6 of Fig. 1;

Fig. 7 is a section on the line 7—7 of Fig. 6;

Fig. 8 is a section on the line 8—8 of Fig. 6;

Fig. 9 is a section on the line 9—9 of Fig. 6;

Fig. 10 is a section on the line 10—10 of Fig. 1;

Fig. 11 is a section on the line 11—11 of Fig. 1;

Fig. 12 is a section on the line 12—12 of Fig. 10;

Fig. 13 is a section on the line 13—13 of Fig. 5;

Fig. 14 is a front elevation of a modified form of the tractor element, with parts in section;

Fig. 15 is an elevation of the apparatus showing an attachment for cutting disks;

Fig. 16 is a perspective view of the attachment;

Fig. 17 shows a top plan view of a modified form of the torch supporting mechanism with parts in section and parts omitted for the sake of clearness; and Fig. 18 is a section on the line 18—18 of Fig. 17.

Referring now to the drawings, the reference character 10 designates a gas cutting apparatus which comprises a carriage 11 having a body portion 12 which may be rectangular in form and an inverted U in cross section. This carriage, as shown, has a substantially flat top wall 13, Fig. 1 and depending side and end walls 14 and 15, respectively, Figs. 3 and 4. The body portion 12 has depending axial supporting members 16, Fig. 4, adjacent to the corners and these supports are provided with stub axles 17 on which are rotatably mounted flanged wheels 18 that are adapted to engage the tracks 19 and 21 which guide the carriage in its longitudinal movement. The carriage is adapted to have mounted thereon the torch supporting mechanism 22 which extends across the carriage beyond the sides thereof. This mechanism comprises a torch supporting bar 23 on which is mounted a combined gear box and motor casing 24, as shown more clearly in Figs. 1 and 6 of the drawings.

Suitable means are provided for supporting the bar 23 on the carriage 10 so that the bar may move endwise and be maintained in a position normal to the longitudinal axis of the carriage. Any suitable mechanism may be employed for this purpose. In the form of the device selected to illustrate one embodiment of the invention, parallel link members are employed for this purpose. As shown, link supporting standards 25 and 26 are mounted on the top wall 13 at each side thereof adjacent what, for convenience of description, will be termed the front end of the carriage. Each of these standards is provided with reduced ends 27 and 28, Fig. 3. The reduced end 28 is adapted to extend through the top wall and is adapted to be held in position by a nut or other suitable fastening means 29 which is threaded on the end 28 of the standard. Rotatably mounted on the standard 25 is the bearing 31 of a swinging arm 32. Suitable anti-friction devices such as the ball bearings 33 may be provided at each end of the bearing 31, as shown in Fig. 3. This arm may be of any suitable form, as, for instance, an I-beam as shown, which may taper outwardly from its bearing 31. The upper end of the standard 25 may also be reduced for extending through an opening in a plate 34 secured against the bearings 33 as by means of a nut 35.

The standard 26 is mounted in a similar manner and has journaled thereon an arm 36 corresponding to the arm 32 described above. The rear ends of the arms 32 and 36 are pivotally attached to the bar 23 as at 37 and 38, respectively. These arms extend beneath the bar 23 and are pivoted thereto by journals as the bolts 20 having ball bearings 30 thereon, Fig. 4. It will thus be seen that the bar 23 has a parallel movement transversely to the carriage in such a manner that the bar 23 may be moved transversely of the carriage. The arms are of the same length and the distance between the pivots 37 and 38 is the same as between the pivots 35 and 36 so that the arm 23 may be moved lengthwise and will be held by the arms 32 and 36 normal to the longitudinal axis of the carriage at all times. The arms, having ball bearings, cause the device to be easily and readily moved by the operating mechanism, as will presently appear.

Mounted on one end of the arm 23 is the torch support or torch supporting device 39 which comprises a clip 41, Figs. 1 and 4, having a depending threaded stud 42 rigid therewith. The arm 23 is provided with a plurality of openings 43 which are adapted to be engaged by the stud 42 for adjusting the support 39 longitudinally of the arm. The clip 41 is provided with a clamping bolt 44 by means of which the shank 45 of a clamping element 46 may be clamped in position. The shank 45 rotatably and slidably engages the clip 41 and is held in adjusted position by tightening the bolt 44. The clamping element 46 is adapted to slidably and rotatably receive the shank 47 of the torch holder 48. A torch 49 is slidably mounted in the holder 48. Preferably, though not necessarily, the torch 49 is provided on one side with a rack 51 which is adapted to be engaged by a pinion 52 mounted on a shaft 53 having the hand wheel 54 at the end thereof (Fig. 4). By rotating the hand wheel 54, the torch 49 may be raised and lowered. The clamp is provided with a clamping bolt 55 by means of which the shank 47 may be clamped in any adjusted position.

It will be seen that by means of this arrangement, the torch 49 has a universal adjustment. It may be adjusted inwardly or outwardly along the arm 23 by applying the shank 42 to any one of the openings 43, as desired, or the shank 47 may be adjusted inwardly or outwardly through the clamp 46 carrying with it the torch 49. The torch may also be adjusted forwardly or backwardly by adjusting the shank 45 through clamp 46. The torch 49 may also be rotated in a vertical plane longitudinally of the carriage and held in any adjusted position by the clamping bolt 55 which engages the shank 47. The torch may also be rotated about a vertical plane transversely of the carriage by first loosening the clamping bolt 44 which clamps the shank 45.

The torch 49 is provided with the conventional preheater conduits 56 and 57 for the oxygen and acetylene or other combustible gases and the conduit 58 for the high pressure oxygen cutting jet, as is usual in such constructions. The low pressure conduits are controlled by a single valve 59 which opens and closes the two conduits 56 and 57 simultaneously and the conduit 58 is provided with a control 61. The controls 59 and 61 are both adjacent to the casing or box 24 so that they will be accessible to the operator, as will presently appear. Since the construction of the gas conduits constitutes no part of the present invention, the same is not described in detail. It will be noted, however, that the controls 59 and 61 are accessible to the operator from his position in operating the machine.

It has been proposed to employ a tracing mechanism or template for guiding the gas cutting torch in its movement during its cutting operation. But, more or less difficulty has been experienced in the use of a tracer element as a tractor mechanism in connection with tracing charts, prints or papers for the reason that the wheel must be so small that the tractor force tends to distort, crumple or disarrange the tracing print or chart and consequently, it is more difficult to follow the lines with the tracer.

The present invention seeks to avoid this difficulty by employing a tractor wheel separate and apart from the tracer wheel. This arrangement permits the use of a comparatively large traction wheel. The tracer wheel must necessarily be small so that sharp angles and turns may be followed and more accurate tracing may be accomplished. The large traction wheel will not disturb the chart or tracing paper or diagram while the small tracer wheel will permit extremely accurate guiding of the cutting torch. The tracing element is geared to the tractor element so that the two operate in synchronism.

On the opposite end of what, for convenience of description, will be termed the inner end of the arm 23, Fig. 4, are mounted a tracer member or mechanism 62 and a tractor member or tractor mechanism 63, which will illustrate one embodiment of the invention.

The tracer member 62, Figs. 3 and 11, comprises a shaft 64 extending through a support or casing 65 secured to the arm 23 and has its upper end provided with a hand wheel 66 for turning the tracer. The casing 65 comprises a lower section 73 and a removable upper section 87. The shaft 64 is journaled in both sections of the casing 65. The lower end of the shaft 64 is bifurcated and provided with a tracer wheel 67 journaled therein which is adapted to control the movement of the apparatus. The tracer shaft 64 is slidably mounted in the support or casing 65 and is yieldably held in lower position by a spring 68, Fig. 11, which engages the lower end of the support casing 65, and a collar 69 adjustably mounted on the shaft 62 by the set screw 69a.

Suitable means are provided for holding the shaft 64 in inoperative position when the apparatus is used in conjunction with a template, as will presently appear. As shown, a collar 71 is employed for this purpose. When it is desired to hold the shaft 64 in elevated position, as when a template is used, the set screw 72 is released, the shaft 64 elevated, and the collar 71 dropped down into contact with the upper side of the casing 65 and the set screw tightened while holding the shaft in elevated position.

Suitable means are also provided for automatically moving the carriage longitudinally along the rails 19 and 21 and for moving the torch supporting bar 23 in response to the movement of the tracer 62. As shown, the tractor mechanism 63 is employed for this purpose. The tracer and tractor mechanisms are mounted adjacent to each other at the inner end of the bar 23 and both extend through the casing 65.

The tractor mechanism 63, Figs. 10 and 11, comprises the hollow shaft 74 having its lower end bifurcated as at 75 and provided with aligned openings within which a journal 76 is secured. The journal 76 has an axial opening 90 for receiving the outer end of a radius rod for cutting circles, as will presently appear. A tractor wheel 77 is mounted on this journal. The upper end of the shaft 74 is slidably keyed to a sleeve 78, Fig. 10, which, in turn, is journaled in a two-part bearing 79, one part of which is integral with the lower portion of the casing 65 and the other part 110 is held by the bolts 111, as shown in Figs. 11 and 3. The upper end of the sleeve 78 is also provided with flanges 60 resting on shouledrs 70 within the casing 65 and the lower end of this sleeve is screw-threaded and a nut 80 holds the flanges loosely against the shoulders. The sleeve 78 may be rotated for rotating the hollow shaft 74, as will presently appear. A spring 81 between an internal annular ledge 82 on the upper end of the sleeve 78 and the upper end of the shaft 74 normally forces the shaft downwardly and with it the tractor wheel 77 for lowering the tractor mechanism, as will presently appear.

Means are provided for operating the traction wheel 77 while the apparatus is in use. As shown, a motor 83 mounted within the box 24, Figs. 6 and 7, is employed for this purpose. The power from the motor 83 is taken through a change speed gear mechanism 84 for operating the power shaft 85, Fig. 6. The power shaft 85, extending into the section 73 of the casing 65, Fig. 10, is provided with a bevel pinion 88 on its outer end which is adapted to engage a bevel gear 89 slidably keyed to a countershaft 91 which extends downwardly through the hollow shaft 74 and has a collar 92 mounted on its lower end for limiting the downward movement of said hollow shaft. The upper end of the shaft 91 has its upper end journaled in a sleeve 93, as shown more clearly in Fig. 10. The upper section 87 of the casing 65 has mounted thereon a flanged sleeve 94 through which the shaft 91 extends.

The tractor mechanism may be elevated when the tractor wheel is not to be used. As shown, the upper end of the sleeve 94 is provided with cam surfaces 95, Fig. 11, which are adapted to be engaged by pins 96 and 97 rigidly connected to opposite sides of the sleeve 93. The sleeve 93 is provided with a handle member 98 whereby upon rotating the handle 98 and with it the sleeve 93, the pins 96 will ride up the cam and elevate the shaft 91 against the compression of the spring 81. The shaft 91 is supported by the sleeve 93 by the head 99 of a screw threaded into the upper end of the shaft 91, as shown more clearly in Fig. 10. The head 99 rests on the inner race of anti-friction bearings 101, the outer race of which in turn rests on the annular shoulder or flange 102 on the sleeve 93. Keyed to the shaft 91 is the bevel gear 89 which is journaled in a split bearing 103 rigid with the lower section 73 of the casing 65. The keyway 104 for the shaft 91 extends to the upper end of said shaft so that by removing the cap screw 99, the shaft 91 and with it the sleeve 74 may be removed from the casing 87. The lower end of the shaft 91 is provided with a worm 105 which is adapted to engage a worm gear 106 on the shaft 107. Keyed to the shaft 107 is a spur gear 108 which meshes with a spur gear 109 rigidly mounted on the hub 110 of the traction wheel 77.

It will thus be seen that when the power shaft 85 is rotated, this will cause the rotation of the bevel gear 89 and with it the shaft 91 and the rotation of the shaft 91 will cause the rotation of the countershaft 107 through the worm 105 and gear 106 and this in turn will rotate the traction wheel 77 through the gears 108 and 109. The gear 109 is rigid with the hub 110 of the tractor wheel 77.

Suitable means are provided for guiding the movement of the tractor wheel 77 in response to the angular movement of the tracer member 62. As shown, the tracer member 62 has slidably keyed thereto a gear 116 which is adapted to be engaged by an idler gear 117 which in turn meshes with a gear 118 non-rotatably mounted on the upper reduced end 119 of the sleeve 78, as shown in Figs. 10 and 11.

When the operator turns the wheel 66, the sleeve 78 is rotated through the chain of gears 116, 117 and 118 and since the hollow shaft 74 is slidably keyed to the sleeve 78, the shaft 74 and with it the tractor wheel 77 will be turned through the same angle due to the fact that the gears 116 and 118 are the same size or rather have the same number of teeth.

In cutting metal sheets of different thicknesses and different material, it is necessary that the speed of the traction wheel 77 be varied. A variable speed motor and a suitable change speed mechanism 121 is employed for this purpose. The change speed mechanism varies the gear ratio between the driving and driven shafts and the use of a variable speed motor permits fine adjustments of speed between the change speed adjustments. For the purpose of disclosure, mechanism for obtaining four different change speeds will be described. The first speed will be considered the lowest in the following description.

This change speed mechanism 121 is mounted in the box 24 and comprises a pinion 122 which is mounted on the motor or power shaft 123, Figs. 7 and 9. This pinion 122 is in permanent engagement with a gear 124. The gear 124 is mounted on a shaft 125 on which a pinion 126 is keyed. The pinion 126 is in permanent mesh with a gear 127 fast on the shaft 128 and keyed to this shaft 128 is a pinion 129 in mesh with a gear 131 which is turn is keyed to a shaft 132 on which is keyed a pinion 133 which in turn is in permanent mesh with the gear 134. Slidably keyed on the power shaft 85 is a master gear 135 which is adapted to be shifted into mesh with the gear 124 for the fourth or highest speed; into mesh with the gear 127 for the third speed; with the gear 131 for obtaining second speed; or, with the gear 134 for obtaining first or the lowest speed. The gear 135 is shifted by means of a yoke 136 (Fig. 6), carried by or rigidly connected to a slidable rack 137. An idler gear 138 (Fig. 8) is in permanent mesh with the rack 137 and is also in permanent mesh with the pinion 139 on the shaft 141.

The shaft 141 extends through the top wall of the motor casing 24, and has an arm 142 attached thereto (Fig. 7). The arm swings over an indicator plate 143, having openings 144 therein and with legends thereon for indicating the different speeds. A spring-pressed detent 145 carried by the outer ends of the arm 142 is adapted to engage in the openings 144 for holding the change speed mechanism in adjusted position. Openings 150 are provided in the indicator plate 143 at points midway between the openings 144, so that when the detent 145 engages these openings the master gear 135 will not be in mesh with any of the change speed gears. In other words, these positions may be termed neutral. When the arm 142 is in the position shown in Figs. 1, 6 and 7, the gear 135 has been moved into mesh with the gear 134 to provide the first or lowest speed. By moving the arm to the left in Fig. 1, the gear 135 will be brought into mesh with the gear 131, and the second or next to the lowest speed will be obtained. The gear 135 may be moved into mesh with the gear 127 for third speed, or moved still further into mesh with the gear 124 for obtaining fourth or highest speed.

The motor is of the reversible variable speed type, and the apparatus is provided with a rheostat 146 whereby variations of speed may be had between the different speeds obtained by the gears of the change speed mechanism. The rheostat 146 may have an index indicating the different speeds of the motor, or preferably may be graduated to indicate the speed of the tractor member 77, as indicated in Fig. 1. It will be noted that in changing from one speed to the other the power shaft 85 is reversed in its rotation; consequently, in practice the motor is reversed for avoiding the reverse rotation of the power shaft.

Suitable means are provided, convenient to the operator, for reversing the motor when the change speed is reversed, or for reversing the motor at other times when it is desired. As shown, a switch 147 is provided for this purpose. The switch 147, when moved to one side, will cause the motor shaft to turn in one direction, and when moved to the opposite extreme will cause the motor shaft to move in the opposite direction.

Suitable means are provided on the inner end of the bar 23 for operating the switch 147, as shown in Fig. 4. As shown, a lever 148 is pivoted at its lower end and has attached to its intermediate portion a rod 149 which is attached to the switch 147 at its outer end, as shown in said figure. The switch lever 148 is located at the inner end of the bar 23 so that all the controls will be accessible to the operator when he is operating the wheel 66 for guiding the tracer wheel 62.

In the form of the construction described above, a tracing sheet or paper 151 is secured in position beneath the tracer and tractor members, as shown in Fig. 1, after the same have first been elevated and the operator, after placing the material to be cut beneath the torch and setting the machine to proper speed, lowers the tracer member 62 and the tractor member onto the sheet and then turns the switch 147 which causes the tractor member to move along the tracing 151. The operator, by means of the handle 66, guides the tracer wheel along the lines 152 of the drawing, pattern or tracing sheet 151, Fig. 1, thus causing the torch to cut the metal according to the pattern or outline traced by the tracer member 62.

In the form of the tracing shown in Fig. 1, the tracer member can be caused to follow the pattern 152 without reversing the motor. But, when the pattern is like that shown at 153 on the pattern sheet 154, Fig. 2; that is, a pattern in which there are sharp angles as at 155, the motor may be reversed when the tracer wheel 62 reaches the apex of the angle, as shown in full lines, so that it may be readily rotated to the dotted line position shown at 156 which necessitates moving the tracer wheel 62 only through a small angle whereas without reversing the motor, the tractor wheel would form a curve because it could not be made to form the sharp angle unless the same be first elevated from the pattern or sketch, since the tractor wheel 77 would continue to travel along the tracing while it is being turned. This is considered an important feature of the invention because it insures sharpness in the angle and also greatly simplifies the operation.

A suitable attachment is provided for use on the apparatus when it is desired to cut the metal to form disks, circles or segments of circles. In the construction selected to illustrate one form of the invention, a plate 157 has attached to its central portion a swivel standard 158 having a clamping member 159 on its upper end. A radius rod 161 is slidable through the clamp 159 and is held in adjusted position by any suitable means such as the set screw 162. The standard 158 is rotatably mounted in a base 163 rigidly secured to the plate 157. The outer end of the rod 161 is provided with a collar 164 spaced from the end and the threaded end is provided with a nut 165 for clamping a support between the collar and the nut.

When it is desired to cut the metal to circular form, the nut 165 is removed and the rod inserted through the axial opening 90 in the bearing 76, Fig. 11, and the nut 165 applied for clamping the rod in position. The tracer member 67 is then elevated out of contact with the plate 157 and the rod is clamped in position so that it will have the desired radius. It will thus be seen that when the rod is applied as shown in Fig. 15, that the tractor wheel 77 will describe a circle about the post 158. The length of the radius of this circle may be adjusted by sliding and adjusting the rod.

In Fig. 13 is shown a modified form of tractor member for the apparatus. In this form of construction, a template 166 is provided for guiding the tractor mechanism. As shown, a modified form of tractor mechanism is substituted for the tractor mechanism 63 shown in Fig. 11. In this form of construction, two tractor members 167 and 168 are employed, the lower ends of which are tapered and knurled as at 169 and 171. The track or template 166, which guides the cutting torch, is received between the inclined surfaces 169 and 171 as shown at the lower portion of Fig. 13.

Suitable differential mechanism is employed for compensating for the unequal rotations of the two tractor members in moving around curves on the template. As shown, tractor members 167 and 168 have upwardly extending shafts 172 and 173 which extend through the lower end of the hollow head 174 and have gears 175 and 176 on the upper ends thereof. These gears are in mesh with the spur gears 177 and 178 mounted on the shafts 179 and 181 which are journaled in the inwardly extending projections 182 and 183 on the head 174. The shafts 179 and 181 are provided at their upper ends with bevel gears 184 and 185 which are in mesh with corresponding bevel gears 186 and 187 on a pair of stub or counter shafts 188 and 189, respectively. Connecting the inner ends of the shafts 188 and 189 is a differential mechanism 191. Since the differential mechanism is of the usual or any well known construction, it is not thought necessary to describe the same in detail.

Carried by the cage 192 of the differential mechanism is the ring gear 193 which is adapted to engage a bevel pinion 194 on the lower end of the shaft 195 which corresponds to the shaft 91 in the previous construction.

The head 174 is provided with a closure 196 which is rigidly held in position on the head as by means of the cap screws 197. The closure member 196 is provided with an upwardly extending hollow stem having a reduced portion 199 which is screw threaded at its upper end for receiving a nut 200. The reduced portion 199 is journaled in a sleeve 201 which in turn is keyed to the sleeve 78 as shown in Fig. 13 of the drawings. In substituting the head 174 for the tractor member 63 it is only necessary to remove the set screw 99 and then remove the entire tractor mechanism 63 downwardly through the sleeve 78. The head 174 and shaft 195, together with the sleeve 201 is inserted in the sleeve 78 and the set screw 99 replaced.

In Figs. 17 and 18 is shown a modified form of means for holding or attaching a plurality of torches to the torch supporting bar 23a. In this form of construction, the outer end of the torch supporting bar 23a is provided with a sleeve or slide 203 through which a rack 204 is adapted to slide longitudinally of the bar 23a for adjusting the torch to and from the bar 23a. A pinion 205 having a stem and hand wheel 206 extending upwardly therethrough is provided in the sleeve or clamp 203 with the pinion in mesh with the rack so as to adjust the rack longitudinally of the bar 23a when the hand wheel 206 is rotated. The outer end of the rack 204 is provided with an integral clamping sleeve 207 through which a rod 208 is adapted to be slid or rotated transversely to the rack. The clamp 207 is provided with a suitable means such as the clamping screw 209 for holding the rod 208 in adjusted position.

Each end of these arms may be provided with a torch supporting and adjusting mechanism 210. Since the two structures 210 are duplicates, only one need be described.

Slidably mounted on the end of the rod 208 is a clamping member 211 having a clamping screw 212 for holding the clamp in angular or longitudinal adjustment on the rod 208. The clamp 211 has provided in its lower surface a clamping member 213 through which a torch supporting rod 214 is adapted to slide or rotate. The rod may be held in adjusted position by any suitable means such as the clamping screw 215, as shown more clearly in Fig. 18 of the drawings. The outer end of the rod 214 is provided with a clamping member 216 for holding the torch 217. The torch is provided with a vertically extending rack 218 and the clamp 216 is provided with a pinion 219 which corresponds to the pinion 52 of the previous construction. The pinion is mounted on a shaft having a hand wheel 221 by means of which the pinion may be rotated for raising and lowering the torch 217 through the clamp 216.

The clamping member 203 may be adjustably secured to the arm 23a in any suitable manner. As shown, the clamp is provided with a downwardly extending shank 222, Fig. 18, which is screw threaded at its lower end for receiving a clamping nut 223 by means of which the clamp is rigidly secured in position in any one of a series of openings 43a on the arm 23a. By means of the shank 222, the arm 208 may be angularly adjusted relative to the bar 23a if it is so desired.

It will thus be seen that by the use of the torch-holding mechanism described the torch may be raised and lowered by rotating the hand wheel 221; it may be moved outwardly and inwardly by rotating the hand wheel 206; it may be moved around the bar 208 by loosening the clamp 211; or it may be rotated in a plane transverse to the bar 23a by loosening the clamp 213. The other torch may likewise be angularly adjusted in planes parallel with, and transversely to, the bar 23a, and also raised, lowered and moved outward to and from the supporting rod 208 and to and from the bar 23a. Additional torches may be mounted on the rod 208, or all may be removed except one, as conditions may require.

In Fig. 14 is shown a modified form of tractor wheel for the tracer member. In this form of construction the wheel 77a is provided with a peripheral groove within which is mounted a rubber tire 77b. Otherwise the construction of this wheel is the same as the wheel 77, for which it may be substituted.

It is thought from the foregoing, taken in connection with the accompanying drawings, that the construction and operation of my device will be apparent to those skilled in the art, and that changes in size, shape, proportion and detail may be made without departing from the spirit and scope of the appended claims.

I claim as my invention:

1. In a gas cutting apparatus, a carriage, a torch supporting bar extending across said carriage to opposite sides thereof, a torch supporting head, means for mounting said head on one end of said bar for universal adjustment of said head, a tracer wheel member on the opposite end of said bar for guiding the movements of said bar and carriage, a tractor, a motor and change speed mechanism mounted on the central portion of said bar and movable therewith, and means for operating said tractor from said motor and change speed mechanism.

2. In a gas cutting apparatus, a carriage, movable parallel arm mechanism carried by said carriage, a torch mounted on said mechanism, tracer wheel means carried on said mechanism, means for manually guiding said tracer, a tractor associated with said tracer, a reversible motor on said mechanism spaced from said tracer for operating said tractor, and change speed mechanism for operating said tractor from said motor whereby said tractor may be operated at different speeds both forwardly and backwardly.

3. In a gas cutting apparatus, a carriage, a track for said carriage, a gas torch supporting bar, parallel link mechanism for supporting said bar from said carriage, a gas cutting torch carried by said bar, a single tractor member carried by said bar for moving said bar and torch, a tracer wheel member for engaging a pattern sheet and for tracing lines thereon, and means interconnecting the tracer and tractor members for positively directing the movements of said tractor member from said tracer wheel member.

4. In a gas cutting apparatus, a carriage, a track for said carriage, a gas torch supporting bar, parallel link mechanism for supporting said bar from said carriage, a gas cutting torch carried by said bar, tractor means carried by said bar for moving said bar and torch, a tracer wheel member offset from the tractor means for engaging a pattern sheet for tracing lines thereon, and means interconnecting the tracer member and tractor means for positively directing the movements of said tractor means from said tracer wheel member.

5. In a gas cutting apparatus, a carriage, a track on which said carriage may travel, a torch supporting bar, a pair of links of equal lengths for supporting said bar, posts mounted on said carriage, anti-friction means for pivotally mounting said links on said carriage, anti-friction means for pivotally mounting said bar on said arms, a torch adjustably mounted on said bar, a tractor movably carried by said bar, means including a tracer member and means for guiding the same for tracing on a print the outline of the cut to be made, said tracer member being offset from said tractor and engaging said print, means for rotating said tractor, and means including gear mechanism between said tractor and tracer member for causing said tractor to move said bar in response to the movement of said tracer member.

6. In a gas cutting apparatus, a carriage, a torch supporting bar, means for movably supporting said bar from said carriage, a torch carried by said bar, a tractor member carried by said bar, means on said bar for operating said tractor member for moving said bar and carriage, a tracer member having an upwardly extending standard swivelled in said torch supporting bar, a hand wheel on the upper end of said standard for rotating the same, means for swivelly mounting said tractor member on said bar, and gear mechanism for causing said tractor member to rotate synchronously with the rotation with said hand wheel.

7. In a gas cutting apparatus, a carriage, a torch supporting bar, means for movably supporting said bar from said carriage, a torch carried by said bar, a tractor member carried by said bar, means on said bar for operating said tractor member for moving said bar and carriage, a tracer member offset from said tractor member and adapted to engage a tracing, means for steering said tracer member, means including an operative connection between said tracer and tractor members for controlling the direction of movement of said tractor member upon steering said tracer member, said last-named means comprising a motor, and change speed mechanism for operating said tractor member from said motor at different speeds.

8. In a gas cutting apparatus, a carriage, a torch supporting bar, means for movably supporting said bar from said carriage, a torch carried by said bar, a tractor member carried by said bar, means on said bar for operating said tractor member for moving said bar and carriage, a tracer wheel offset from said tractor member for engaging a tracing sheet, interconnecting gears between said tractor and tracer members, means for manually turning said tracer wheel member about a vertical axis for changing the direction of movement of said tractor member through various angles, a reversible motor, and change speed mechanism for operating said tractor member from said motor at different speeds, said change speed mechanism reversing the direction of rotation of said tractor member on changing from one speed to the next adjacent speed whereby the direction of rotation of said tractor member on changing speed may be made to continue in the same direction by reversing said motor.

9. In a gas cutting apparatus, a carriage, a torch supporting bar movably mounted on said carriage, a tractor member mounted on said bar, a reversible motor carried by said bar, a vertical shaft rotatably mounted on said bar, a tracer wheel offset from said tractor member rotatably mounted on said shaft, intermeshing gear mechanism for turning said tractor member about a vertical axis from said tracer member, a handle member on said shaft for manually turning the same for tracing the outline of a pattern for causing said torch to reproduce such outline as said tractor member moves said bar, a change speed mechanism for said tractor member, said change speed mechanism comprising a train of speed reducing gears and pinions permanently intermeshing, and a shiftable gear shiftable into mesh in a continuous order with said gear for obtaining different speeds for said tractor member, said motor being of the variable speed reversible type whereby very fine adjustments of the speed of said tractor member may be obtained while moving either forwardly or rearwardly.

10. In a gas cutting apparatus, a carriage, a torch supporting bar, means for movably supporting said bar from said carriage, a torch carried by said bar, a single tractor wheel member carried by said bar, means on said bar for operating said tractor member for moving said bar and carriage, a tracer wheel member, means for controlling the direction of movement of said tracer wheel member, said tracer wheel member being offset from said tractor wheel member, means including a train of gears interposed between said tracer and tractor wheel members for steering said tractor wheel member upon steering said tracer wheel member, a reversible motor, and change speed mechanism for operating said tractor member from said motor at different speeds in either direction, said change speed mechanism reversing the direction of rotation of said tractor member on changing from one speed to the next adjacent speed whereby the direction of rotation of said tractor member on changing speed may be made to continue in the same direction by reversing said motor, a handle for changing said speed mechanism, a handle for operating the reversible motor switch, and a handle for manually controlling the direction of movement of said tracer member, all of said handles being easily accessible to the operator while in position for operating said tracer member.

11. In a gas cutting apparatus, a carriage, a substantially straight track for said carriage, a pair of standards on said carriage, parallel swinging arms journaled on said standards, a torch supporting bar extending transversely to said carriage and pivotally attached to said bar, a tractor member swivelly mounted on one end of said bar, a torch adjustably mounted on the opposite end of said bar, conduits for conducting preheating and cutting gases to said torch, valves for said conduits, controls for said valves, a tracer wheel member adjacent to said tractor member and in advance thereof when moving straight ahead under normal operating conditions, means including a handle member on said tracer member for simultaneously controlling the direction of movement of said tracer and tractor members, a reversible variable speed motor carried by said bar, means for operating said tractor member from said motor, a control for reversing said motor, and a control for varying the speed of said motor, change speed mechanism between said motor and tractor member, a handle for operating said change speed mechanism, all of said handles and controls being so located on said apparatus as to be accessible to the operator from the side of the carriage adjacent to said tracer member.

12. In a gas cutting apparatus, a carriage, a gas cutting torch, means, including a bar, for movably mounting said torch on said carriage, said means comprising a clamp mounted on said bar and rotatable about a vertical axis, means for adjusting said clamp along said bar and for rigidly securing the same in position, a second clamp having a round shank rotatable and lengthwise adjustable in said first named clamp, a torch holder sleeve having a shank rotatably and slidably adjusted in said second clamp, a torch slidably mounted in said sleeve, and means for raising and lowering said torch.

13. In a gas cutting apparatus, a carriage, a gas cutting torch, means, including a bar, for movably mounting said torch on said carriage, said means comprising a sleeve mounted on said bar and rotatable about a vertical axis, means for adjusting said sleeve along said bar and for rigidly securing the same in position, a rack slidable through said sleeve, means including a pinion engaging said rack for adjustably moving said rack through said sleeve, a clamp on the outer end of said rack, a rod slidably and rotatably mounted in said sleeve, a pair of torches, and means for adjustably mounting said torches on the end portions of said rod in such manner that said torch may be raised and lowered and moved in planes parallel with said bar or at an angle thereto.

14. In a gas cutting apparatus, a carriage, movable parallel arm mechanism carried by said carriage, a torch mounted on said mechanism, a tractor wheel at one end of said mechanism, wheel tracer means carried on said mechanism for guiding said tractor wheel, and a motor mounted on an intermediate portion of said arm mechanism and spaced a material distance from said tractor for operating said tractor.

FRED STONEBERG.